June 21, 1949.  E. J. BENES  2,473,778
FISHING ROD HOLDER
Filed Aug. 28, 1946
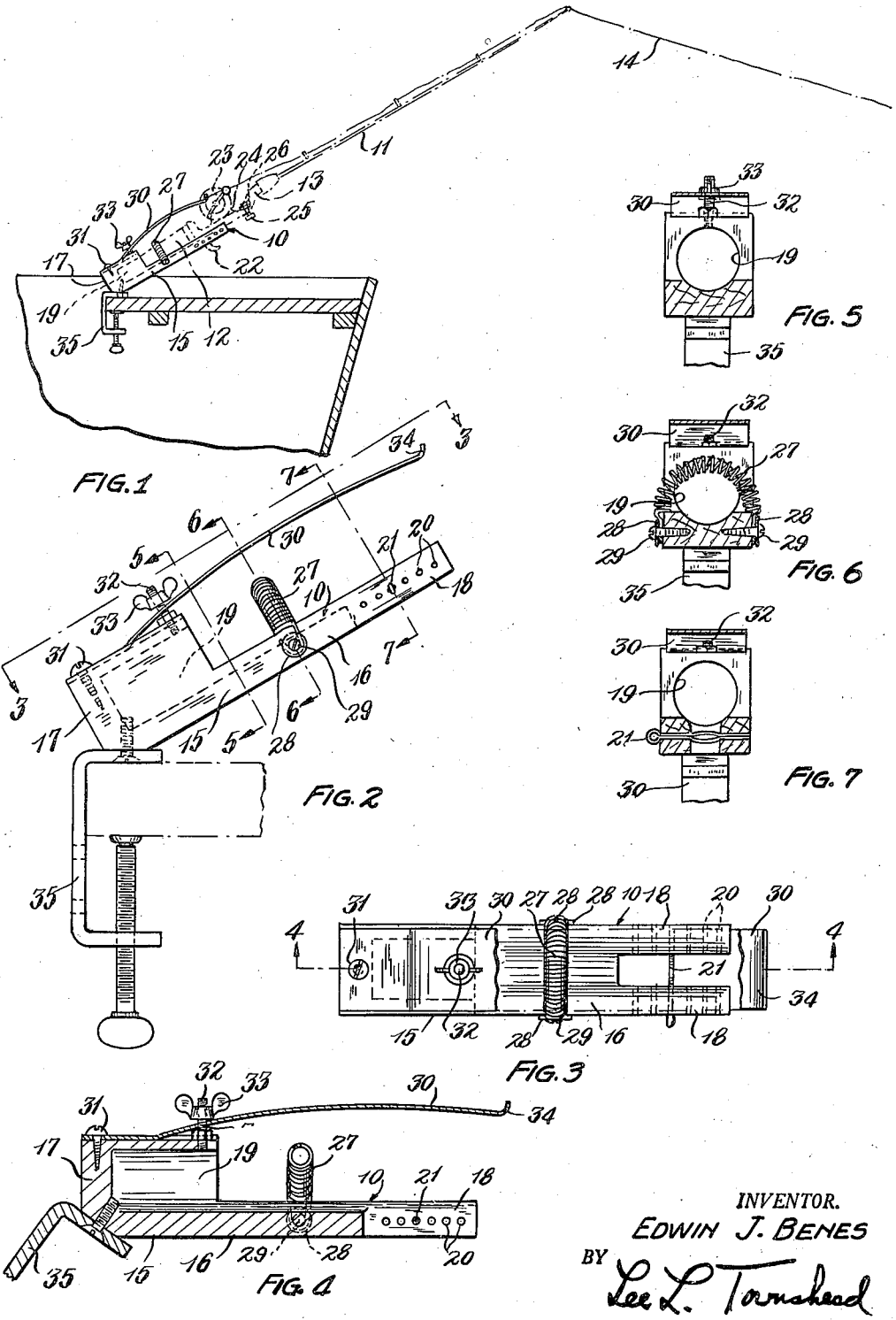
INVENTOR.
EDWIN J. BENES
BY Lee L. Townshead
ATTORNEY Patented June 21, 1949

2,473,778

UNITED STATES PATENT OFFICE 2,473,778

FISHING ROD HOLDER

Edwin J. Benes, Newburgh Heights, Ohio

Application August 28, 1946, Serial No. 693,540

5 Claims. (Cl. 43—4)

This invention relates to improvements in fishing rod holders, and more particularly, though not in a limiting sense, to a fishing rod holder particularly adapted to be used in the method of fishing by dragging a hook and line, known as trolling.

Objects of my invention are to provide a rod holder into which a fishing rod handle can be quickly and easily inserted and removed, said holder also being adapted to act as a brake means on a fishing line.

Other and further objects of my invention will appear during the course of the following description:

In the accompanying drawings forming a part of this specification:

Fig. 1 is an elevational view of an illustrative embodiment of my invention, clamped to a boat and supporting a fishing rod.

Fig. 2 is an elevational view of a holder, without a fishing rod, clamped to a supporting member.

Fig. 3 is a top plan view of the holder shown in Fig. 2.

Fig. 4 is a sectional view taken on the line 4—4 of Fig. 3.

Fig. 5 is a sectional view taken on the line 5—5 of Fig. 2.

Fig. 6 is a sectional view taken on the line 6—6 of Fig. 2, while

Fig. 7 is a sectional view taken on the line 7—7 of Fig. 2.

In the drawings, the numeral 10 represents the holder generally, while a conventional fishing rod 11 having a handle 12 connected to the main body of the rod by an off-set portion 13 supports a fishing line 14 at its outer end, in a well known manner. The holder 10 comprises a holding member 15, best shown in Figs. 2, 3 and 4, made of any suitable material, having an elongated body portion 16, and an enlarged socket portion 17 at one end and two parallel spaced arms 18 at the other end.

The socket portion 17 of the holder 10 is provided with a generally horizontally extending aperture 19 adapted to receive and hold a fishing rod handle 12, while a series of oppositely disposed horizontal apertures 20 are provided in the spaced arms 18 at the opposite end of the holder, which are adapted to receive a split pin 21 serving to limit the extent of insertion of a fishing rod handle 12 in the aperture 19 by engaging a finger grip 22 provided in the rod handle 12. The split pin 21 is adapted to be spaced apart between the parallel arms 18 to function as a spring clip to lock the pin 21 in a pair of oppositely disposed apertures 20.

A line reel 23, releasably mounted on a clip 24 secured to the off-set portion 13 of the handle 12 by a set screw 25 screw-threadedly engaging a lug 26, serves to control the fishing line 14 in a well-known manner. A coiled spring member 27, disposed in arcuate formation over the top of the body portion 16 and secured to opposite sides thereof by lugs 28, is secured to the sides of the body member 16 by machine screws 29. The normal diameter of the coiled spring member 27 is slightly smaller than the diameter of the rod handle 12 so that it flexes when the rod handle 12 is inserted therein, thereby providing a tight grip on the rod handle 12, and thus prevents longitudinal movement of the handle 12 in the holder 10, when it is being moved along the water.

A flat braking spring 30, formed of spring steel or other suitable material is secured to the top face of the socket portion 17 of the holding member 15, by means of machine screw 31, while a threaded stud 32 projecting upwardly from the socket portion 17 is provided with a wing nut 33, screwthreadedly adjustable longitudinally of the stud 32 to regulate the tension of the outer end of the braking spring 30 on the coiled fishing line 14 wound around the reel 23. The outer end of the brake spring 30 is curved upwardly as indicated at 34. The holder 10 is adapted to be releasably fastened to the gunwale or other member of a boat by means of an adjustable clamp 35 in an obvious manner. The width of braking spring 30 is such that it will extend along the entire width of the line wound on a conventional fishing reel spool. The braking spring 30 is arched upwardly as shown in Figs. 1, 2 and 4, for the purpose of providing maximum leverage and spring action.

In use, the holder 10 is fastened to a suitable member of a boat by means of the adjustable clamp 35, a conventional location of the holder being at the rear of a boat used in a trolling fishing operation with the holder 10 tilted upwardly, as shown in Fig. 2. A fishing rod handle 12 is then slid along the elongated body portion 16 of the holding member 15 and under the coiled spring member 27 until its end securely rests in the aperture 19 of the socket portion 17. The split pin 21 serves as a stop member for the finger grip 22 of the rod 11. The position of reel 23 is capable of longitudinal adjustment in the holder 10 by selectively inserting the split pin 21 in a pair of oppositely disposed apertures 20, positioned in such manner that the reel 23 is mounted on the off-set portion 13 of the rod handle 12, with the end of the flat braking spring 30 just inwardly from the curved portion 34 resting on the line 14 wound on the center portion of the reel 23.

The outer end of the flat braking spring 30 rests on the fishing line 14 coiled on the reel 23, the tension of the same thereon being regulated by means of the wing nut 33 in an obvious manner. It has been found to be advantageous to regulate the tension of the end of the brake spring 30 so that it will hold the line 14 as it is being moved through the water in such manner that it will not unwind from the reel 23. When the tension of the spring 30 is adjusted to merely hold the line securely for the particular speed of the boat and with the desired length of fishing line payed out, the dragging of the fixed length of line continues until a strike is made. At that time the sudden impact and pull exerted on the line, due to the forward movement of the boat, would tend to break the line in the absence of spring or cushioning means. At that instant, the resiliency of the flat braking spring 30, permits a sufficient length of the line to be payed out from the reel 23, which movement will cushion or temper the impact or pull caused thereby and thus prevents the line from breaking. The same action occurs when the line becomes snagged while the boat is moving. The user can quickly detach the rod handle 12 from the holder 10 by merely pulling it outwardly. It will thus be understood that the flat spring 30 provides a braking action on the line reel for a trolling operation and serves as a resilient cushioning means at the time of a strike or whenever the line becomes snagged. The arcuate coiled spring 27 provides a firm yet readily releasable holding means, for holding the rod handle 12 in the holding member 15.

It will be understood by those skilled in the art, that the present embodiment of my invention is illustrative only, and that the embodiment of my invention may be variously changed, used or modified without departing from the spirit of my invention or sacrificing the advantages thereof.

I claim:

1. In fishing apparatus the combination of, a fishing rod, a rod holder adapted to receive and hold said rod, resilient holding means mounted on said holder adapted to embrace said rod in said holder in opposition to longitudinal pulling forces tending to release said rod from said holder, a brake member mounted on said holder and extending toward the forward end of the handle where it is adapted to rest on a line carried on a reel mounted on said handle for preventing the line from unwinding in response to movement of said rod along a body of water, and adjustable stop means adapted to regulate the longitudinal position of the rod on said holder for positioning a reel in relation to said braking member in such manner that the outer end of said member rests on the reel line, for the purposes described.

2. In fishing apparatus the combination of, a fishing rod, a rod holder adapted to receive and hold said rod, a coiled spring member extending over said holder and adapted to permit a rod to be inserted thereunder for retaining said rod in said holder in opposition to longitudinal pulling forces tending to release said rod, a flat spring brake member mounted on said holder and extending toward the forward end of the handle where it is adapted to rest on a line carried on a reel mounted on said handle for preventing the unwinding of said line in response to movement of said rod along a body of water, and adjustable stop means adapted to regulate the longitudinal position of a reel mounted on said rod in relation to said braking member in such manner that the outer end of said member rests on the reel line, for the purposes described.

3. In fishing apparatus the combination of, a fishing rod, a line reel mounted thereon, a finger grip member disposed on the handle of said rod, an elongated rod holder adapted to receive and hold a rod, resilient holding means for releasably holding said rod on said rod holder in opposition to longitudinal pull tending to release said rod from said holder, a brake member mounted on said holder and having an end portion adapted to rest on a line carried on said reel for preventing the line from unwinding from said reel in response to movement of said rod along a body of water, and adjustable stop means on said holder cooperating with said finger grip member for regulating the position of said rod on said holder in order that the reel may be mounted in said holder with the end of the brake member resting on the line reel, for the purposes described.

4. In fishing apparatus the combination of, a fishing rod, a line reel mounted thereon, a finger grip member disposed on the handle of said rod, an elongated rod holder adapted to releasably support a rod, resilient holding means into which the rod is inserted for holding said rod against longitudinal pull tendency to release said rod from said holder, a spring brake member mounted on said holder and having an end portion adapted to rest on a line carried on said reel for preventing the line from unwinding from said reel in response to movement of said rod along a body of water, and adjustable stop means associated with said rod holder for regulating the longitudinal position of said rod on said holder in order that the end of the brake member is disposed on said reel, for the purposes described.

5. In fishing apparatus the combination of, a fishing rod, a rod holder adapted to receive and hold said rod, holding means mounted on said holder adapted to retain said rod in said holder in opposition to longitudinal pulling forces tending to release said rod from said holder, and a brake member mounted on said holder and extending toward the forward end of the handle where it is adapted to rest on a line carried on a reel mounted on said handle for preventing the line from unwinding in response to movement of said rod along a body of water, adjustable stop means adapted to regulate the longitudinal position of the rod on said holder, for positioning a reel in relation to said braking member in such manner that the outer end of the said member rests on the reel line, and adjusting means for regulating the tension of said brake member end on said line.

EDWIN J. BENES.

REFERENCES CITED

The following references are of record in the file of this patent:

UNITED STATES PATENTS

| Number | Name | Date |
| --- | --- | --- |
| 1,256,191 | Wittkowski | Feb. 12, 1918 |
| 1,299,959 | Keyser | Apr. 8, 1919 |
| 1,552,535 | Beerstecher | Sept. 8, 1925 |
| 2,238,127 | Nissen | Apr. 15, 1941 |